US008023471B2

(12) United States Patent
Koo

(10) Patent No.: US 8,023,471 B2
(45) Date of Patent: Sep. 20, 2011

(54) METHOD OF PERFORMING COMMUNICATION ACCORDING TO CONTROL INFORMATION IN A WIRELESS COMMUNICATION SYSTEM

(75) Inventor: Hyoun Hee Koo, Anyang-si (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 12/858,388

(22) Filed: Aug. 17, 2010

(65) Prior Publication Data

US 2010/0309888 A1 Dec. 9, 2010

Related U.S. Application Data

(63) Continuation of application No. 11/761,055, filed on Jun. 11, 2007, now Pat. No. 7,801,531.

(30) Foreign Application Priority Data

Jun. 12, 2006 (KR) ........................ 10-2006-0052330

(51) Int. Cl.
*H04Q 7/00* (2006.01)

(52) U.S. Cl. ........ 370/332; 370/331; 370/333; 370/334; 455/432.1; 455/436; 455/442; 455/452.2

(58) Field of Classification Search ....... 455/432.1–453; 370/328–333
See application file for complete search history.

(56) References Cited

U.S. PATENT DOCUMENTS

| 5,913,168 | A | * | 6/1999 | Moreau et al. | ................ 455/441 |
|---|---|---|---|---|---|
| 6,393,286 | B1 | * | 5/2002 | Svensson | ....................... 455/437 |
| 6,920,317 | B1 | * | 7/2005 | Muhonen | ...................... 455/405 |
| 7,907,589 | B2 | * | 3/2011 | Shimizu et al. | ................ 370/345 |
| 2001/0026542 | A1 | * | 10/2001 | Kusaka et al. | ................ 370/331 |
| 2004/0162074 | A1 | * | 8/2004 | Chen | ............................ 455/437 |
| 2004/0266446 | A1 | * | 12/2004 | Nguyen et al. | ................ 455/450 |
| 2005/0239466 | A1 | * | 10/2005 | Calin et al. | .................... 455/437 |
| 2005/0261017 | A1 | * | 11/2005 | Vaittinen et al. | .............. 455/522 |
| 2006/0068780 | A1 | * | 3/2006 | Dalsgaard et al. | ......... 455/432.3 |
| 2007/0004445 | A1 | * | 1/2007 | Dorsey et al. | ................. 455/525 |
| 2008/0119187 | A1 | * | 5/2008 | Gallagher et al. | ............ 455/436 |

FOREIGN PATENT DOCUMENTS

CN 1319964 10/2001

OTHER PUBLICATIONS

3GPP Organization Partners, "3rd Generation Partnership Project; Technical Specification Group GSM/EDGE Radio Access Network; Radio Subsystem Link Control (Release 5)", 3GPP TS 45.008 V5.22.0, Apr. 2006.

* cited by examiner

*Primary Examiner* — Dai A Phuong
(74) *Attorney, Agent, or Firm* — Lee, Hong, Degerman, Kang & Waimey

(57) ABSTRACT

A method of communicating with a network in a wireless communication system is disclosed. More specifically, the method includes performing handover by a mobile station (MS) from a first cell to a second cell, and measuring signal strengths of neighboring cells by the MS after moving to the second cell using the at least one default value if at least one parameter is not provided from the second cell.

16 Claims, 2 Drawing Sheets

(a)

(b)

METHOD OF PERFORMING COMMUNICATION ACCORDING TO CONTROL INFORMATION IN A WIRELESS COMMUNICATION SYSTEM

CROSS-REFERENCE TO RELATED APPLICATIONS

This application is a continuation of U.S. application Ser. No. 11/761,055, filed on Jun. 11, 2007, now U.S. Pat. No. 7,801,531, which claims the benefit of Korean Application No. P2006-052330, filed on Jun. 12, 2006, the contents of which are hereby incorporated by reference herein in their entirety.

BACKGROUND OF THE INVENTION

1. Field of the Invention

The present invention relates to a method of communicating, and more particularly, to a method of performing communicating according to control information in a wireless communication system.

2. Discussion of the Related Art

A General Packet Radio Service (GPRS) is a mobile data service available to users of global system for mobile communication (GSM) and interim standard-136 (IS-136) mobile phones. GPRS is the first high speed digital data service provided by cellular carriers that used the GSM technology.

Second generation (2G) cellular systems combined with GPRS is often described as "2.5G", that is, a technology between the second (2G) and third (3G) generations of mobile telephony. It provides moderate speed data transfer, by using unused time division multiple access (TDMA) channels in, for example, the GSM system.

GPRS is different from the older circuit-switched data (CSD) connection included in GSM standards. In CSD, a data connection establishes a circuit, and reserves the full bandwidth of that circuit during the lifetime of the connection. GPRS is packet-switched which means that multiple users share the same transmission channel, only transmitting when they have data to send. This means that the total available bandwidth can be immediately dedicated to those users who are actually sending at any given moment, providing higher utilization where users only send or receive data intermittently. Web browsing, receiving e-mails as they arrive and instant messaging are examples of uses that require intermittent data transfers, which benefit from sharing the available bandwidth.

With mobility of mobile devices using the GPRS system, it is important that services are provided effectively and efficiently between the network and the mobile device.

SUMMARY OF THE INVENTION

Accordingly, the present invention is directed to a method of performing communicating according to control information in a wireless communication system that substantially obviates one or more problems due to limitations and disadvantages of the related art.

An object of the present invention is to provide a method of communicating with a network in a wireless communication system.

Another object of the present invention is to provide a method of communicating with a network in a wireless communication system during handover.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of communicating with a network in a wireless communication system includes performing handover by a mobile station (MS) from a first cell to a second cell, and measuring signal strengths of neighboring cells by the MS after moving to the second cell using the at least one default value if at least one parameter is not provided from the second cell.

In another aspect of the present invention, a method of communicating with a network in a wireless communication system during handover includes performing handover by a mobile station (MS) from a first cell to a second cell, and measuring signal strengths of neighboring cells from the second cell by the MS using the at least one default value until the MS receives at least one parameter from the network if the at least one parameter is not provided from the network to the MS after the MS moves to the second cell.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
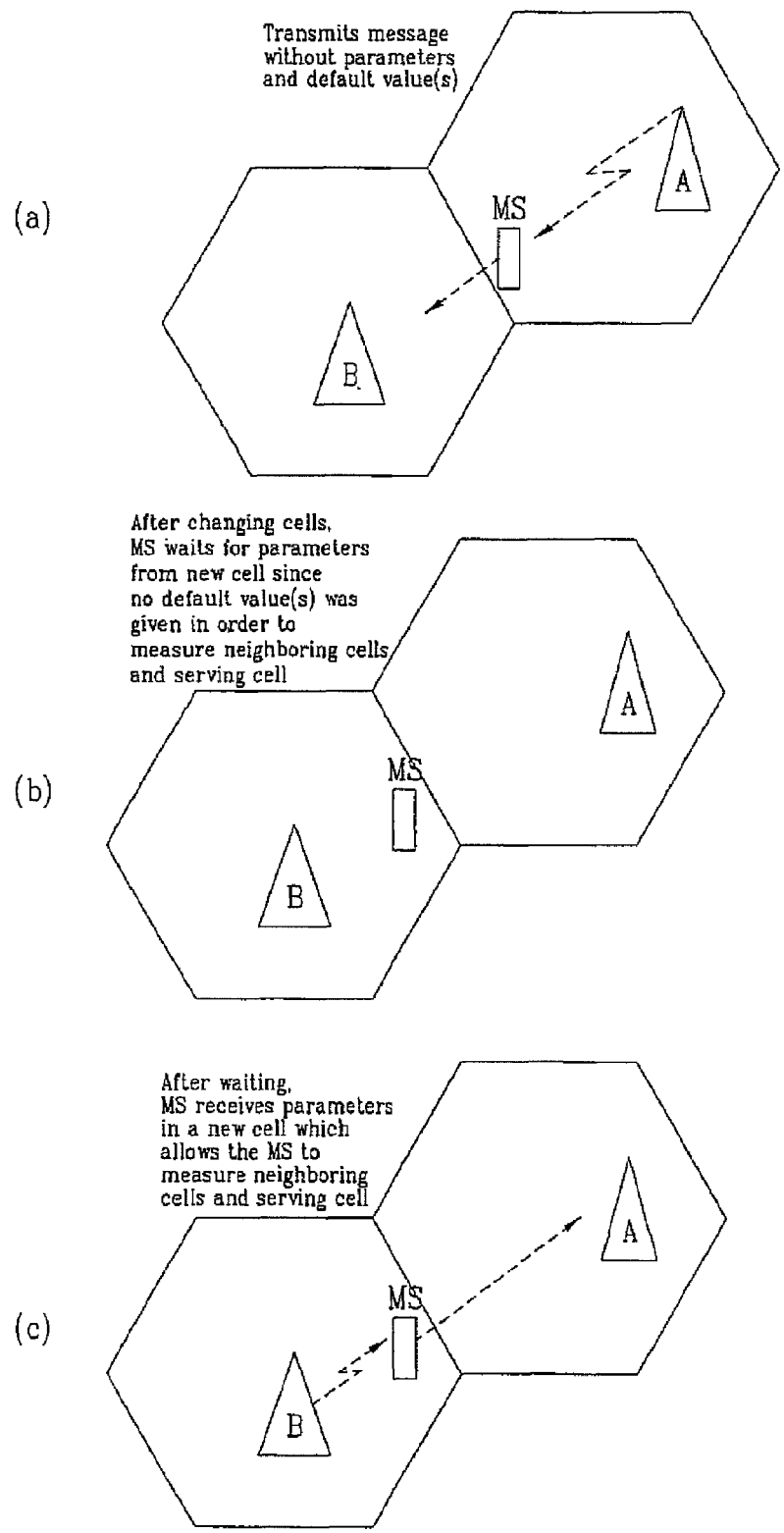
FIG. 1 is an exemplary diagram illustrating handover in which a MS moves from one cell to another cell.

Reference will now be made in detail to the preferred embodiments of the present invention, examples of which are illustrated in the accompanying drawings. Wherever possible, the same reference numbers will be used throughout the drawings to refer to the same or like parts.

A General Packet Radio Service (GPRS) system can be defined as a system that uses a packet-switched (PS) method. A Global System for Mobile Communication (GSM) can be defined as a system that uses a circuit-switched (CS) method. In order to maintain radio link in these systems, various parameters are used. However, due to basic differences between these systems, the parameters used for maintaining radio link are also different and mutually exclusive.

The parameters used to maintain radio link include SERVING_BAND_REPORTING, REP_PRIORITY, REPORTING_RATE, and INVALID_BSIC_REPORTING.

First, the SERVING_BAND_REPORTING parameter can be used by a mobile station (MS) to measure the strength of the received signal and report the measurement to a network (which can also be referred to as a base station (BS)). Here, the measurement refers to a number of cells, or put differently, a number of broadcast control channel (BCCH) carriers that must be included in a serving frequency band of the GSM. The serving frequency band of the GSM is a core frequency bandwidth determined according to communication standard (e.g., GSM 900, GSM 800, and GSM 710).

The network can instruct the MS of measurements of the received signal from the cells (or BCCH carriers) and the reports. The MS can then perform measurement according to the instruction from the network. In reporting the result of the measurement to the network, the MS has to know the number of cells (or BCCH carriers) included in or served by the network. To put differently, the SERVING_BAND_REPORTING parameter signifies the number of cells (or BCCH carriers) indicated in the measurement report to the network. In other words, this parameter can be used to indicate the number of cells from the GSM serving frequency band that can be included in the measurement report. Furthermore, this parameter is two (2) bits and can have values represented by 0, 1, 2, or 3.

Second, the REP_PRIORITY parameter can be used to indicate priority regarding reporting of the received signal strength of neighboring cells in a network. More specifically, the MS can measure the received signal strengths of the neighboring cells according to the instruction from the network. Here, the measurement of the signal strength is based on a list of neighboring cells which is known by the MS.

The REP_PRIORITY parameter can be used to indicate the reporting priority per cell. The measurement of the signal strengths is not performed on all the neighboring cells, but rather on the neighboring cells which satisfy prescribed criterion/criteria. Here, the specified criterion/criteria can vary, and the SERVING_BAND_REPORTING parameter can be one of the specified criterion/criteria. In other words, the neighboring cells, which satisfy the specified criterion/criteria, are measured by the MS, and the cells which do not satisfy the specified criterion/criteria are not measured by the MS.

If the measurements are performed on non-satisfying cells, the measurements are based on the REP_PRIORITY parameter. Furthermore, the REP_PRIORITY parameter is one (1) bit and is represented by the values of '0' or '1'. Here, '0' means normal or that there is no priority, and '1' means high or that there is priority.

Third, the REPORTING_RATE parameter can be used to indicate the allowed reporting rate. In other words, this parameter can be used to indicate the frequency of reports of the received signal strength of the neighboring cells. The REPORTING_RATE parameter is one (1) bit and is represented by the values of '0' or '1'. Here, '0' means normal and '1' means reduced. In other words, the indication of '0' means that the frequency of reporting is as specified by the network which is similar to a default value. Moreover, the indication of '1' means that the measurements of reporting is less frequent which can be interpreted as the duration by which the measurements are performed are further spread apart. Simply put, the REPORTING_RATE parameter can be used to determine how often or frequently the MS needs to measure the received signal strengths of the neighboring cells.

Fourth, the INVALID_BSIC_REPORTING parameter can be used to indicate whether the MS needs to measure and report cells which have invalid BSIC but have allowed NCC part. In other words, this parameter can be used to indicate if GSM cells with invalid BSIC and allowed NCC part may be reported.

More specifically, the network provides information of neighboring cells to the MS. The information includes a base station identification code (BSIC). The MS then uses this information or the BSIC to measure the received signals of the cells corresponding to the BSIC provided from the network.

For example, if the MS is moving at a high speed or making an emergency call, the MS can receive signals from other cells besides the cells specified or provided by the network. That is, the MS is not receiving signals from the cells corresponding to the BSIC provided from the network, but instead, the MS can receive signals from the cells not corresponding to the BSIC provided from the network.

If the MS receives signals from the cells not corresponding to the BSIC provided from the network, then the MS can measure and store information related to the strength of the received signals, and this stored information can include the allowed NCC part of the cell(s) corresponding to the BSIC.

The BSIC is six (6) bits, and three (3) of six (6) bits is reserved for the NCC part and the other three (3) bits is reserved for the BCC part. Here, the NCC part is a public land mobile network (PLMN) color code (or code) and the BCC is a BSS color code (or code).

If the BSIC of the invalid cell includes the allowed NCC part, there can be a problem as to whether the MS would report to the network information related to the received signal strength.

As discussed, the INVALID_BSIC_REPORTING parameter can be used to indicate invalid BSIC. The INVALID_BSIC_REPORTING parameter can further be used to indicate the GSM cell(s) having the allowed NCC part. In other words, the INVALID_BSIC_REPORTING parameter can be used to indicate whether the MS needs to report the information related to the GSM cell(s) having the allowed NCC part.

The INVALID_BSIC_REPORTING parameter is one (1) bit and can be represented by the value of '0' or '1'. Here, the value '0' indicates that the MS need not report the information related to the GSM cell(s) having the allowed NCC part to the network, and the value '1' indicates that the MS needs to report the information related to the GSM cell(s) having the allowed NCC part to the network.

The parameters discussed above are used between the MS and the network to facilitate control of each radio link. Further, these parameters are used to facilitate control of the radio link in the GSM/GPRS/EDGE mobile communication environment, thus allowing efficient power control and/or handover/handoff control.

During handover, it is possible that the parameters of above (or any other parameters) may not be provided to the MS from the network. If this case, the MS in a new cell cannot perform measurements of the radio link of the neighboring cells. As a result, this MS has to wait until it receives the necessary parameters before it can start performing the measurements. In other words, without the necessary parameters from the network when the MS moves into a new cell during handover, the MS Cannot perform specified procedure, including measurements, causing unnecessary delay.

To resolve this type of problem, a default value can be assigned to each of the discussed parameters (e.g., SERVING_BAND_REPORTING, REP_PRIORITY, REPORTING_RATE, and INVALID_BSIC_REPORTING). By assigning default values, the MS can perform measurements on the current cell as well as neighboring cells after entering a new cell without receiving parameter values from the network.

FIG. 1 is an exemplary diagram illustrating handover in which a MS moves from one cell to another cell. As illustrated in (a) of FIG. 1, the MS is located in Cell A but can move to Cell B. Here, the current cell (i.e., Cell A) can provide parameter(s) to the MS. However, this/these parameter(s), which can include default value(s), would be useful in the current cell only.

In other words, the network or the serving BS can provide at least one parameter to the MS. The at least one parameter is optionally provided, which means that the network (or the serving BS) need not provide the parameter to the MS.

In (b) of FIG. 1, the MS has moved from Cell A to Cell B. However, if to a new cell (i.e., Cell B) fails to provide the MS with parameter(s) required to perform measurements of signal strengths of neighboring cells, the MS has to wait to receive the REP_PRIORITY parameter from the target BSS which controls Cell B.

In detail, if the current cell or the new cell (i.e., Cell B) does not provide the parameters necessary to begin measuring the signal strength of the neighboring cells after the MS moves to the new cell, the MS cannot begin to measure the signal strengths of the neighboring cells of the new cell (i.e., Cell B). For example, if the REP_PRIORITY parameter is not provided by the current cell, the MS can measure the signal strengths of specified neighboring cell(s) but cannot measure the signal strengths of other neighboring cell(s).

In (c) of FIG. 1, the MS receives the REP_PRIORITY parameter from the target BSS. After this parameter and/or other necessary parameters for measuring the signal strengths of neighboring cells is received, the MS in the new cell can begin the perform measurements.

As described by the example of FIG. 1, the MS has to wait to receive necessary parameter(s) from the new cell before the MS can begin measuring signal strengths which can cause unnecessary delay.

Figure 2:
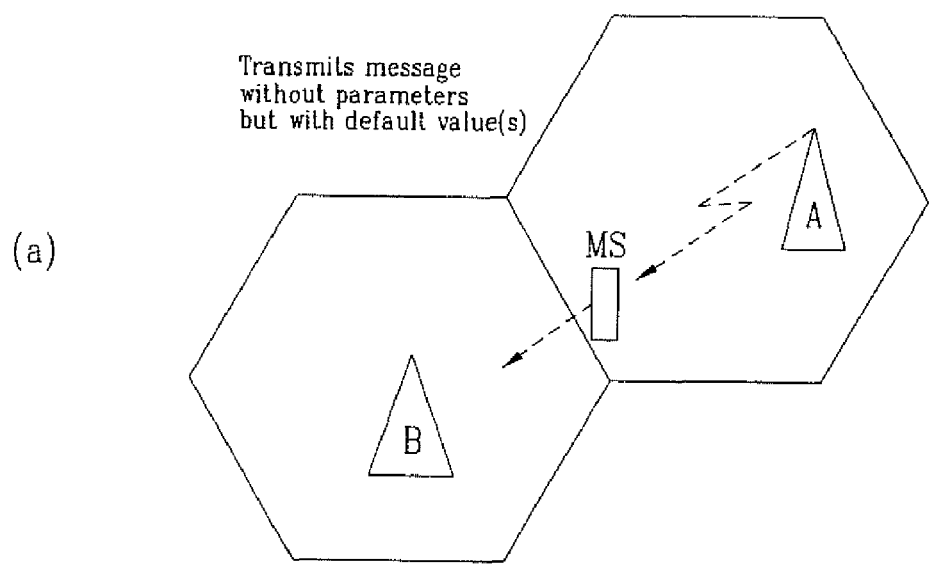
FIG. 2 is an exemplary diagram illustrating the MS with the default values.
Figure 2:
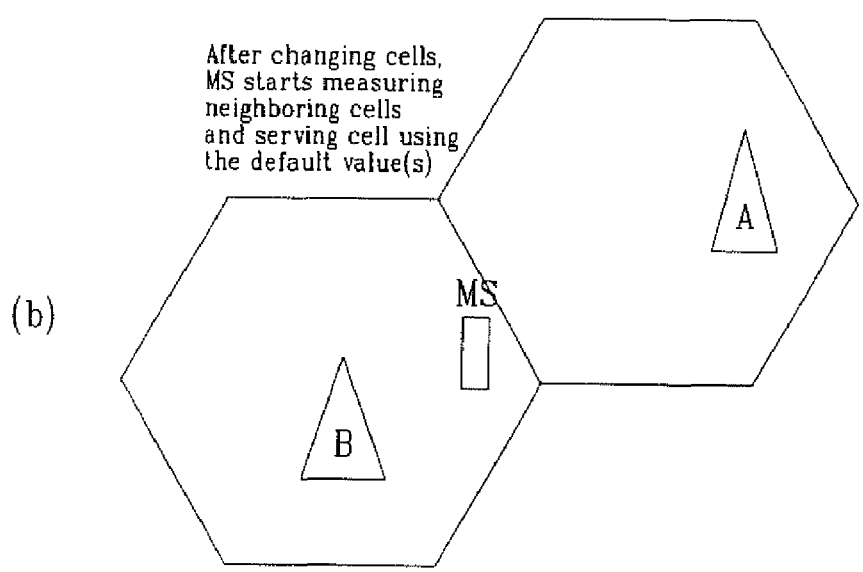

FIG. 2 is an exemplary diagram illustrating the MS with the default values. More specifically, in this figure, the MS is provided with at least one default value associated with the parameter(s). Hence, in handover from Cell A to Cell B, the MS can be assigned default value(s) for the parameter(s) which can be used to perform measurements after moving to a new cell (i.e., Cell B) absent parameters.

In (a) of FIG. 2, the parameters are not provided to the MS in Cell A. However, at least one default value corresponding to respective parameter(s) can be assigned. In (b) of FIG. 2, with the at least one assigned default value, the MS can perform measurements on the signal strengths of the neighboring cells after moving to Cell B even if the parameters are not provided from the network to the MS. Here, the default value(s) corresponding to respective parameters can be pre-assigned and/or stored in the memory of the MS. With that, the MS does not have to be dependent on receiving parameter(s) from the new cell.

For example, if the MS does not receive a parameter from the network after moving to a new cell (i.e., Cell B), the MS can still measure the signal strengths of the neighboring cells in Cell B using the default value(s). As a result, the MS does not have to wait and experience delay in carrying out a specified procedure such as measuring the signal strengths of the neighbor cell(s).

Further, if the parameters are provided from the network while the MS is measuring the signal strengths using the default value(s), the MS can then use the parameters instead to carry on signal strength measurements.

The default value(s) discussed above will be described in detail. More specifically, the description will refer to the default values associated with four (4) parameters used in controlling the radio link in the GPRS system environment.

First, the default value for the SERVING_BAND_REPORTING parameter can be set to '3'. The rationale is that the default value is set to a large value so that the MS can provide more accurate measurement results of the neighboring cells to the network.

Second, the default value for the REP_PRIORITY parameter can be set to '0'. As discussed, the value of '0' indicates that there is no priority, also known as normal or normal operation. Furthermore, as discussed, the MS measures the signal strengths of the neighboring cells based on the list of neighbor cells. That is, based on the list of neighboring cells provided from the network, the MS measures the signal strengths on these neighboring according to a prescribed standard or procedure while the remaining cells are measured according to the REP_PRIORITY parameter. With the default value, the MS measures the signal strengths of the neighboring cells without the REP_PRIORITY parameter. As for the remaining cells, it is preferable to set the default value to '0' or normal as opposed to or high.

Third, the default value for the REPORTING_RATE parameter can be set to '0'. As discussed, the value of '0' indicates that the frequency of reporting is as specified by the network, also referred to as normal or normal operation. For accurate reporting of the measurement results, it is preferable to set the default value to '0' or normal.

Fourth, the default value for the INVALID_BSIC_REPORTING parameter can be set to '0'. As discussed, the value of '0' indicates that the MS need not report to the network the information related to the GSM cell(s) having the allowed NCC part. This parameter is usually applicable in special circumstances such as emergency situations and/or when the MS is moving at a high speed. As such, in non-special circumstances or normal situations, it is not preferable to set the default value for the INVALID_BSIC_REPORTING parameter as '1' which indicates that the MS needs to report the information related to the GSM cell(s) having the allowed NCC part to the network. Rather, it is preferable to set the default value for the INVALID_BSIC_REPORTING parameter as '0'.

The parameters having the default values assigned thereto, as discussed above, are used in the GPRS system. Different from the GSM system which is based on the CS method, the GPRS system is based on the PS method. Since the GSM system is based on the CS method, the channels are fixedly allocated/assigned whereas the GPRS system uses shared channels. That is, the GPRS system allows for multiple MSs to share the radio resources and not limit or fix a certain resource to one MS.

Since the four (4) parameters discussed above are applied in the GPRS system, they are transmitted via the GPRS system channels. More specifically, the SERVING_BAND_REPORTING parameter can be transmitted through any one of a packet broadcast control channel (PBCCH), a packet common control channel (PCCCH), or a packet associated control channel (PACCH). To put differently, the SERVING_BAND_REPORTING parameter can be transmitted through PS-based channel(s).

Further, the other parameters, REP_PRIORITY, REPORTING_RATE, and INVALID_BSIC_REPORTING, can also be transmitted through any one of the PBCCH, PCCCH, or PACCH to the MS. In short, the parameters discussed above can be transmitted through PS-based channel(s).

The setting or assignment of the default values as discussed above is not limited to the exemplary discussion of above. As indicated, the discussion above is merely an example, and as such, the default values can be set differently and in different combinations.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of communicating with a network in a wireless communication system, the method comprising:
   receiving an INVALID BSIC REPORTING parameter by a mobile station (MS) from a network through a packet switched channel, wherein the INVALID BSIC REPORTING parameter indicates whether Global System for Mobile communication (GSM) cells which have an invalid Base Station Identification Code (BSIC) and an allowed Network Color Code (NCC) part are reported; and
   performing measurement reporting signal strengths of neighboring cells by the MS using the INVALID BSIC REPORTING parameter and default values including a default value of a serving band reporting parameter and a default value of a reporting priority parameter when the serving band reporting parameter and the reporting priority parameter have not been provided from the network,
   wherein the default value of the reporting priority parameter is set to 0 to indicate normal operation and the default value of the serving band reporting parameter is set to 3 to indicate a number of cells from a GSM serving frequency band, and
   wherein the wireless communication system is a General Packet Radio Service (GPRS) system which is based on a Packet Switched (PS) method.

2. The mobile station according to claim 1, wherein the packet switched CHannel is any one of a Packet Broadcast Control CHannel (PBCCH), a Packet Common Control CHannel (PCCCH), or a Packet Associated Control Channel (PACCH).

3. The method according to claim 1, wherein the reporting priority parameter indicates a reporting priority per the neighboring cells.

4. The method according to claim 1, wherein the default value of the serving band reporting parameter indicates reporting the measured signal strengths for three of the neighboring cells.

5. The method according to claim 1, wherein the serving band reporting parameter is two (2) bits and is represented by a value of 0, 1, 2, or 3.

6. The method according to claim 1, wherein the reporting priority parameter is one (1) bit and is represented by a value of 0 or 1.

7. The method according to claim 1, wherein the default value of the serving band reporting parameter and the default value of the reporting priority parameter are pre-assigned or stored in a memory of the mobile station.

8. The method according to claim 1, further comprising:
   receiving the serving band reporting parameter and the reporting priority parameter from the network; and
   performing measurement reporting the signal strengths of the neighboring cells considering the serving band reporting parameter and the reporting priority parameter provided from the network.

9. A mobile station (MS) for communicating with a network in a wireless communication system, the MS configured for:
   receiving an INVALID BSIC REPORTING parameter from a network through a packet switched channel, wherein the INVALID BSIC REPORTING parameter indicates if Global System for Mobile communication (GSM) cells which have an invalid Base Station Identification Code (BSIC) and an allowed Network Color Code (NCC) part may be reported; and
   performing measurement reporting signal strengths of neighboring cells using the INVALID BSIC REPORTING parameter and default values including a default value of a serving band reporting parameter and a default value of a reporting priority parameter when the serving band reporting parameter and the reporting priority parameter have not been provided from the network,
   wherein the default value of reporting priority parameter is set to 0 to indicate normal operation and the default value of the serving band reporting parameter is set to 3 to indicate a number of cells from a GSM serving frequency band, and
   wherein the wireless communication system is a General Packet Radio Service (GPRS) system which is based on a Packet Switched (PS) method, 10. The method according to claim 1, wherein the packet switched CHannel is any one of a Packet Broadcast Control CHannel (PBCCH), a Packet Common Control CHannel (PCCCH), or a Packet Associated Control CHannel (PACCH).

11. The mobile station according to claim 9, wherein the reporting priority parameter indicates a reporting priority per the neighboring cells.

12. The mobile station according to claim 9, wherein the default value of the serving band reporting parameter indicates reporting the measured signal strengths for three of the neighboring cells.

13. The mobile station according to claim 9, wherein the serving band reporting parameter is two (2) bits and is represented by a value of 0, 1, 2, or 3.

14. The mobile station according to claim 9, wherein the reporting priority parameter is one (1) bit and is represented by a value of 0 or 1.

15. The mobile station according to claim 9, wherein the default value of the serving band reporting parameter and the default value of the reporting priority parameter are pre-assigned or stored in a memory of the mobile station.

16. The mobile station according to claim 9, further configured for
   receiving the serving band reporting parameter and the reporting priority parameter from the network; and
   performing measurement reporting the signal strengths of the neighboring cells considering the serving band reporting parameter and the reporting priority parameter provided from the network.

* * * * *